United States Patent [19]

Nagai

[11] Patent Number: 5,468,060
[45] Date of Patent: Nov. 21, 1995

[54] RECORDING AND/OR REPRODUCING DEVICE PROVIDED WITH SHUTTER

[75] Inventor: Takuya Nagai, Sendai, Japan

[73] Assignee: Alps Electric Co., Ltd., Tokyo, Japan

[21] Appl. No.: 313,700

[22] Filed: Sep. 27, 1994

[30]    Foreign Application Priority Data

Oct. 7, 1993 [JP] Japan .................................. 5-251690

[51] Int. Cl.⁶ .................................................. A47B 77/08
[52] U.S. Cl. ..................... 312/223.2; 360/97.02; 369/77.2; 369/77.1; 369/75.1
[58] Field of Search .............. 312/223.2, 223.1, 312/9.9, 9.16, 9.17; 369/75.1, 77.1, 77.2; 360/99.02, 97.04, 99.02, 99.01, 99.06; 361/685

[56]             References Cited

U.S. PATENT DOCUMENTS

| | | |
|---|---|---|
| 4,285,524 | 8/1981 | Hughes et al. ..................... 369/77.2 X |
| 4,785,365 | 11/1988 | Ohkita . |
| 4,811,137 | 3/1989 | Muto et al. ............................ 369/77.2 |
| 5,086,422 | 2/1992 | Hagiya et al. .................... 360/97.02 X |
| 5,111,350 | 5/1992 | Carey et al. ........................ 369/77.2 X |
| 5,123,004 | 6/1992 | Arai ..................................... 369/77.2 X |
| 5,153,867 | 10/1992 | Inoue ..................................... 369/77.2 |
| 5,255,256 | 10/1993 | Engler et al. ..................... 369/75.1 X |
| 5,299,078 | 3/1994 | Mabuchi et al. ................... 369/77.2 X |
| 5,301,178 | 4/1994 | Okabe et al. .......................... 369/77.1 |

*Primary Examiner*—Jose V. Chen
*Assistant Examiner*—Rodney B. White
*Attorney, Agent, or Firm*—Guy W. Shoup; Patrick T. Bever

[57]              ABSTRACT

A recording and/or reproducing device, particularly provided with a shutter for opening and closing an insertion slot of a front panel. Such a device has a front panel provided with an insertion slot for receiving a recording medium therethrough. A shutter is pivoted to a chassis so as to open and close the insertion slot of the front panel. A groove is further arranged on the inner surface of the inward projection of the front panel so as to receive the free surface of the shutter therein.

6 Claims, 3 Drawing Sheets

RECORDING AND/OR REPRODUCING DEVICE PROVIDED WITH SHUTTER

BACKGROUND OF THE INVENTION

1. Field of the Invention

The present invention relates to a recording and/or reproducing device for performing recording and/or reproducing operations, and more particularly, to a recording and/or reproducing device provided with a shutter for opening and closing an insertion slot of a front panel.

2. Description of the Related Art

Conventionally, a recording and/or reproducing device, for example, a 3.5-inch floppy disk drive, is known such that a recording medium (disk) is accommodated in a hard cartridge so as to read or write information from/into such recording medium.

The following type of such a device is also known such that a cartridge insertion slot is closed without having a cartridge loaded therein so as to prevent the entry of dust from the outside, thereby providing protection from read/write errors caused by the attachment of dust to a transducer or to the surface of a medium.

Such a conventional recording and/or reproducing device will be explained with reference to FIG. 6.

A front panel 3 used as a design element is attached to the front surface of a chassis 2 of a recording and/or reproducing device generally denoted by 1. An insertion slot 4 for receiving a recording medium therethrough is formed on the front panel 3. A shutter 5 is pivoted to the chassis 2 so as to open and close the insertion slot 4 of the front panel 3 and is urged in the direction for closing the insertion slot 4 by a coil spring, or the like.

Mounted on the chassis 2 are a spindle motor for setting and rotating a recording medium, a magnetic head for reading and writing a signal from/into the recording medium, a carriage for transporting the magnetic head to a desired recording track position, and a circuit substrate for controlling the overall device (which elements are not shown). Upper and lower shield covers 6 are mounted to cover such elements on the chassis 2.

These days, information processing devices, such as computers and word processors, loaded with the foregoing recording and/or reproducing devices, are being widely used. Such devices are becoming smaller and lighter for easy portability.

When the user transports the recording and/or reproducing device (FDD)1, for example, in order to connect the device (FDD)1 to a host processor, such as a personal computer, the user holds the device (FDD)1 in the directions indicated by the arrows F shown in FIG. 6, and whereby stress is most likely to be applied in such directions.

As illustrated in FIG. 6, when a large force F is applied downward without having a cartridge loaded into the device FDD1, the lower surface (free surface) 5a of the shutter 5 abuts against the inner surface 3a of the inward projection of the front panel 3. When a larger force F is further applied, the following problems might occur. The lower surface 5a of the shutter 5 slides along the inner surface 3a of the front panel 3 in the direction for inserting the cartridge (as indicated by the broken lines in FIG. 6), thereby deforming the front panel 3, the shield cover 6 and a cartridge supporting element (not shown) within the FDD1, and accordingly detracting from the outer appearance from an aesthetic point of view (deformation of the front panel 3). Further, the cartridge insertion slot 4 and a cartridge are in contact with each other to be worn out during insertion and ejection so as to be scratched, or a cartridge is unable to be inserted.

As described above, the shutter 5 unavoidably slides in the direction for inserting a cartridge (rearward direction) with the application of stress even though a stopper is arranged with a view to preventing the shutter 5 from advancing forward from the front surface thereof, thereby causing the foregoing problems.

Such problems occur particularly due to rough handling of the recording and/or reproducing device 1. In view of this background, there is a great demand from the user for a recording and/or reproducing device resistible to such rough handling.

SUMMARY OF THE INVENTION

Accordingly, an object of the present invention is to provide a recording and/or reproducing device which has sufficient strength to withstand the stress applied along the thickness of the device, and which is also capable of responding to a demand for making the device thinner.

According to the present invention, when a large force F is applied downward without having a cartridge loaded into the FDD, it causes the free surface of the shutter to bend, and the free surface is thus fit into the groove, thus preventing the shutter from sliding in the direction for inserting a cartridge (rearward direction) and in the direction for ejecting the cartridge. Further, the shutter intervenes between the groove and the front panel as a cushioning element so as to bear the stress applied from the outside, thereby protecting the device from the deformation which might prevent a cartridge from being attachable and detachable to/from the device.

DESCRIPTION OF THE PREFERRED EMBODIMENTS

Figure 1:
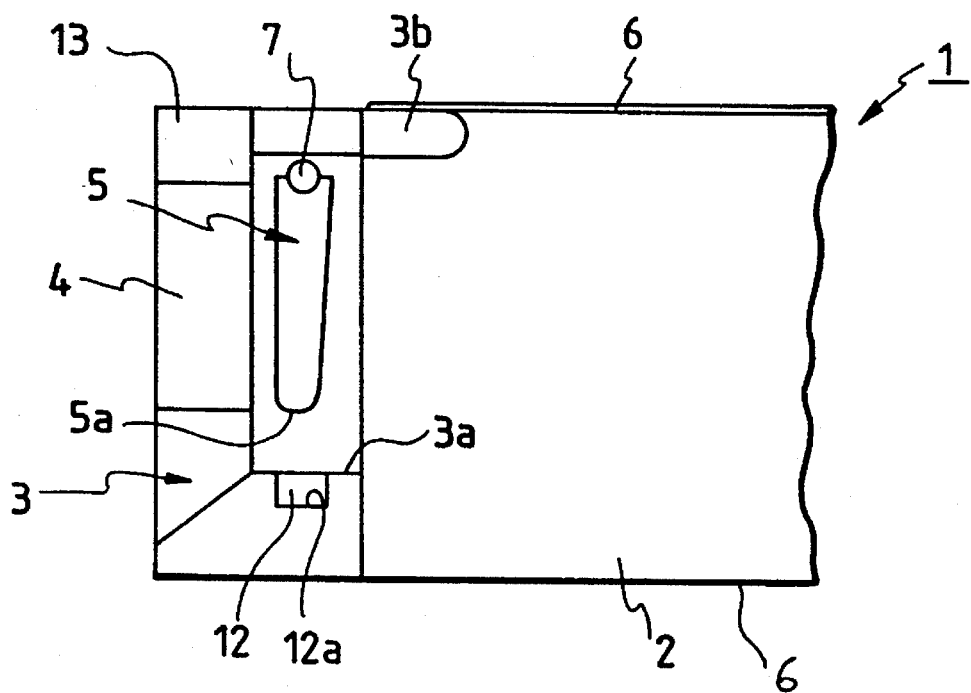
FIG. 1 is a schematic view of a recording and/or reproducing device of a first embodiment according to the present invention without the application of stress.

An embodiment of the present invention will now be described with reference to the drawings.

An explanation will first be given with reference to FIGS. 1–4 of a 3.5-inch floppy disk drive as a recording and/or reproducing device of a first embodiment according to the present invention.

A front panel 3 used as a design element is attached to the front surface of a chassis 2 of a recording and/or reproducing device generally denoted by 1. An insertion slot 4 for receiving a recording medium therethrough is formed on the front panel 3. A pivot pin 7 is arranged on each longitudinal end of a shutter 5 which is thus pivoted to the chassis 2. This shutter 5 serves the function of opening and closing the insertion slot 4 of the front panel 3 and is urged in the direction for closing the insertion slot 4 by a coil spring, or the like. The shutter 5 may be pivoted to either of the front panel 3 or a shield cover 6 instead of the chassis 2.

Mounted on the chassis 2 are a spindle motor 8 for setting and rotating a recording medium, a magnetic head 9 for reading and writing a signal from/into the recording medium, a carriage 10 for transporting the magnetic head 9 to a desired recording track position, and a circuit substrate 11 for controlling the overall device. The upper and lower shield covers 6 are mounted to cover such elements on the chassis 2. The upper shield cover 6 is engaged with an engaging portion 3b of an upper frame 13 of the front panel 3.

Figure 4:
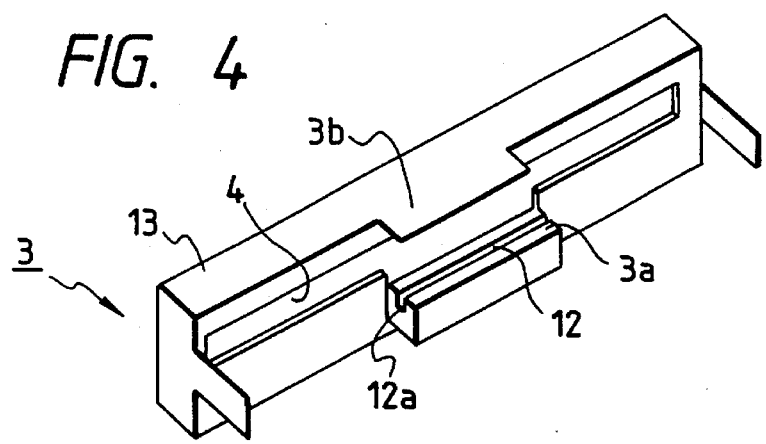
FIG. 4 is a perspective view of a front panel of the recording and/or reproducing device of the first embodiment according to the present invention.

As illustrated in FIG. 4, a recessed groove 12 in parallel to the shutter 5 is formed on the inner surface 3a of the inward projection of the front panel 3 opposedly facing a non-pivotable surface (free surface) 5a of the shutter 5.

The operation of the first embodiment will now be described.

Figure 2:
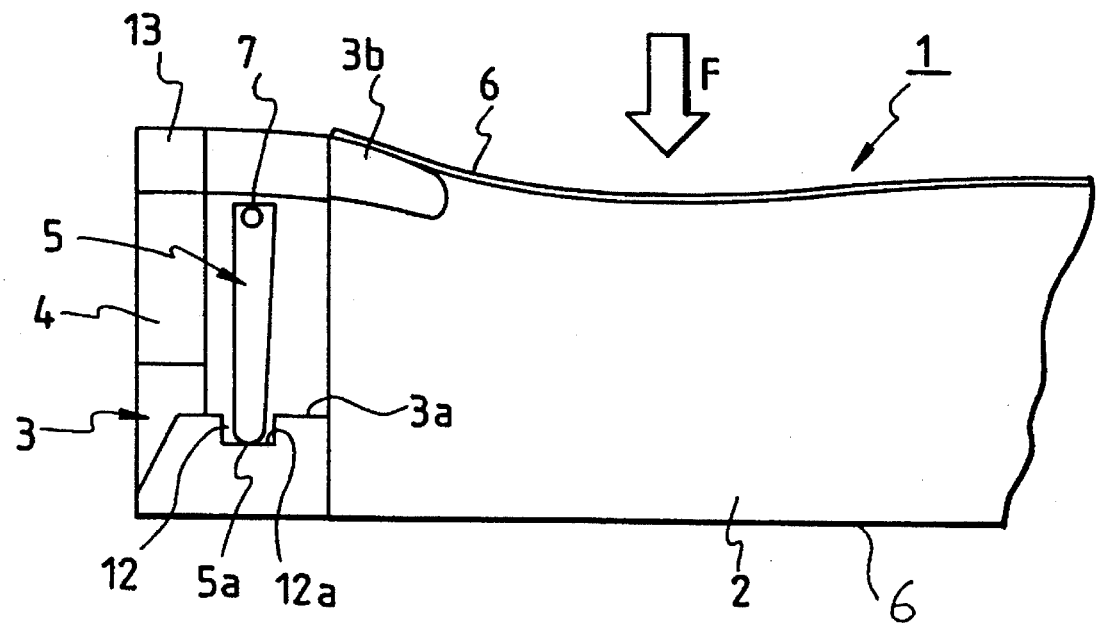
FIG. 2 is a schematic view of the recording and/or reproducing device of the first embodiment according to the present invention with the application of stress.
Figure 3:
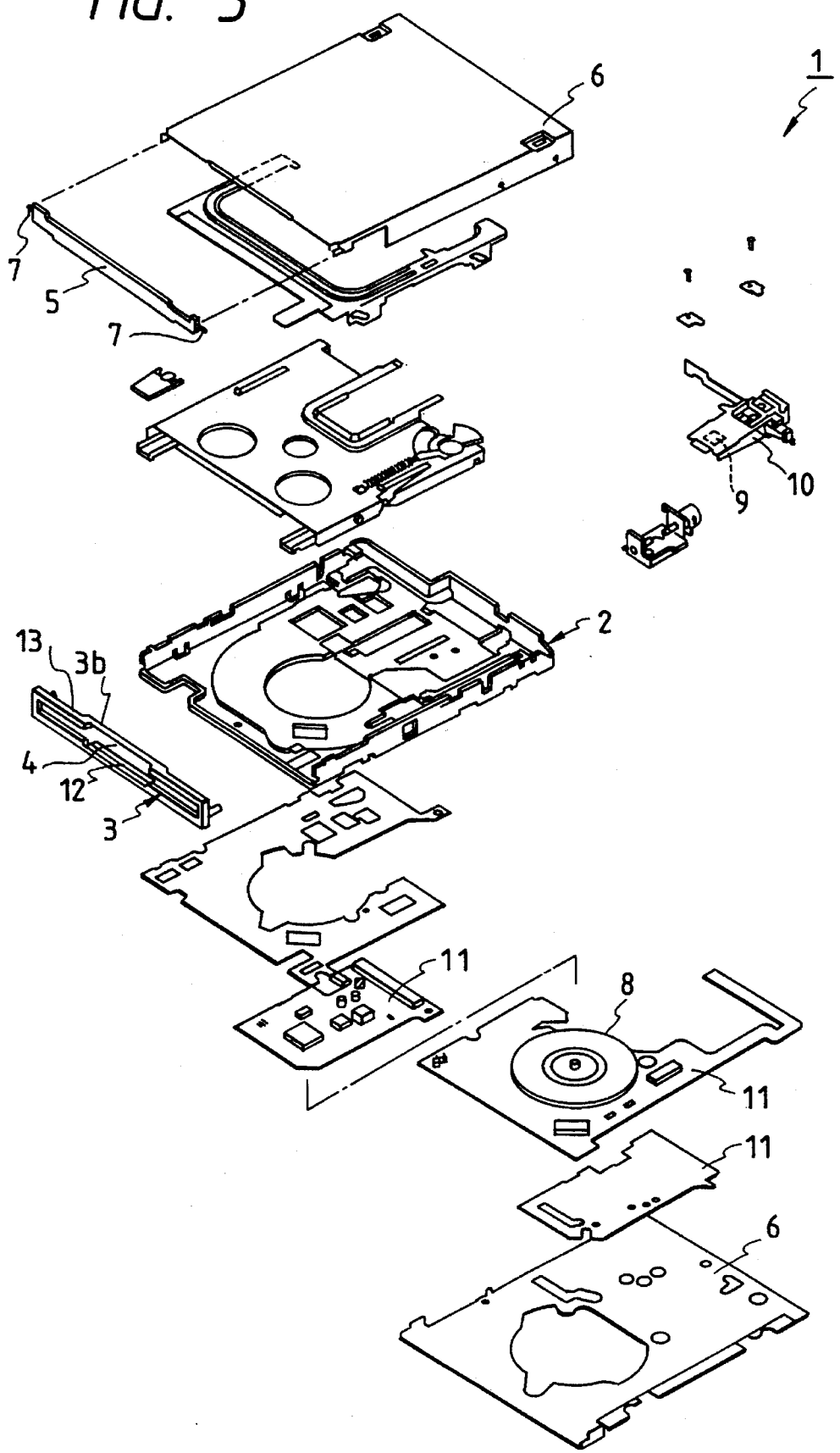
FIG. 3 is an exploded perspective view of the overall construction of the recording and/or reproducing device of the first embodiment according to the present invention.

During the handling of the recording and/or reproducing device 1, when stress is applied in the direction indicated by the arrow F shown in FIG. 2, that is, along the thickness of the recording and/or reproducing device, the engaging portion 3b of the front panel 3, which is engaged with the shield cover 6, bends downward so as to allow the shutter 5 to be also pressed down to bend, the central region of which is most bent, thereby permitting the free surface 5a to be fit into the groove 12. As shown in FIG. 2, the bottom surface (the free surface) 5a of the shutter 5 is brought into contact with the bottom surface 12a of the groove 12 so as to intervene between the groove 12 and the upper frame 13 of the front panel 3 as a cushioning element to bear the stress applied from the outside, thereby preventing the application of an excessive load to the respective elements of the device. This further protects the device from the foregoing deformation which might prevent a cartridge from being attachable and detachable to/from the device.

As will be clearly understood from the foregoing description, the first embodiment constructed as described above offers the following advantages.

As stated above, the recording and/or reproducing device 1 comprises the front panel 3 provided with the insertion slot 4 for receiving a recording medium, and the shutter 5 pivoted to one of the elements, such as the chassis 2, the shield cover 6 and the front panel 3, so as to open and close the insertion slot 4 of the front panel 3. In such a device 1, the groove 12 is arranged on the inner surface 3a of the inward projection of the front panel 3 so as to receive the free surface 5a of the shutter 5. Thus, when a large force F is applied downward without having a cartridge loaded into the device, it causes the free surface 5a of the shutter 5 to bend, and the free surface 5a is thus fit into the groove 12, thereby preventing the shutter 5 from sliding in the direction for inserting a cartridge (rearward direction) and in the direction for ejecting the cartridge. Further, the shutter 5 intervenes between the groove 12 and the front panel 3 as a cushioning element so as to bear the stress applied from the outside, thereby protecting the device from the deformation which might prevent a cartridge from being attachable and detachable to/from the device. This also gives rise to an increase in the strength relative to the stress applied along the thickness of the device, thereby enabling a response to the demand for making the device thinner.

An explanation will be further given of a second embodiment of the present invention.

The bending amounts of the pivot pins 7, 7 and the shutter 5 vary depending upon whether the stress is applied to the substantially central region of the longitudinal shutter 5 or to and adjacent to the pivot pins 7, 7 which are formed at both ends of the shutter 5. The pivot pins 7, 7 formed at both ends of the shutter 5 bend relatively less and are more vulnerable to the stress so that they are likely to be destroyed.

Figure 5:
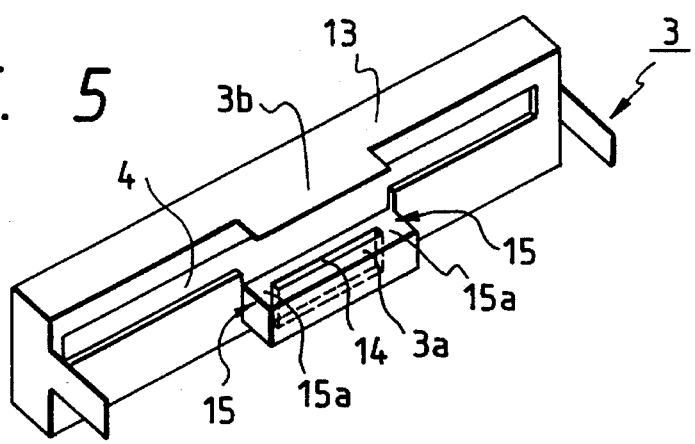
FIG. 5 is a perspective view of a front panel of the recording and/or reproducing device of a second embodiment according to the present invention.
Figure 6:
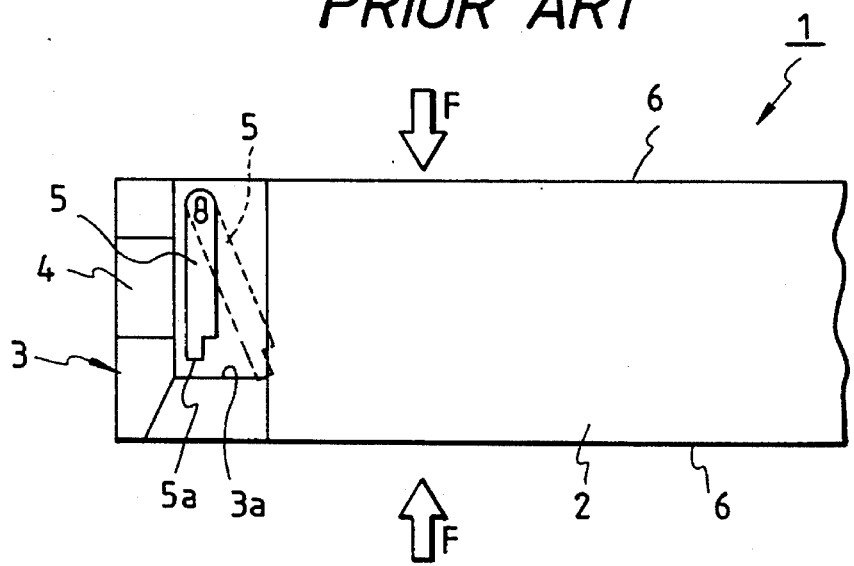
FIG. 6 is a schematic view of a conventional recording and/or reproducing device.

In order to solve the above problem, the second embodiment is constructed as follows. As shown in FIG. 5, a groove 14 in parallel to the shutter 5 is arranged on the inner surface 3a of the inward projection of the front panel 3 opposedly facing the non-pivotable surface (free surface) of the shutter 5. In contrast to the first embodiment shown in FIG. 4, the groove 14 is closed by end portions 15, 15 in the longitudinal direction. That is, the recessed groove 14 is formed at the central region of the front panel 3, except for the end portions 15, 15.

The groove 14 is closed by the end portions 15, 15 because it is preferable that the stress applied to the pivot pins 7, 7 which are provided for both ends of the shutter 5 should be incurred by the portions as close as possible to the pivot pins 7, 7. In the second embodiment provided with such end portions 15, 15, the central region of the free surface 5a of the shutter 5 is also fit into the groove 14 but does not contact the bottom of the groove 14.

Unless specially explained, constructions in the second embodiment are similar to those in the first embodiment.

As will be clearly understood from the foregoing description, in addition to the advantages obtained in the first embodiment, the second embodiment constructed as described above offers the following advantages.

As illustrated in FIG. 5, the second embodiment is constructed to bear the stress in such a way that the groove 14 is closed by the end portions 15, 15 in the longitudinal direction so as to allow the lower surface of the shutter 5 which has bent due to the stress as described above to abut against the upper surface 15a (or corners) of the end portions 15, 15. As a result, the pivot pins 7, 7 can be protected from an excessive load which results from the stress applied to and adjacent to the pivot pins 7, 7, thereby preventing them from being broken.

What is claimed is:

1. A recording device including:

a front panel having an insertion slot for receiving a recording medium therethrough; and a shutter pivotally connected to one of a chassis, a shield cover and said front panel so as to open and close said insertion slot of said front panel, said device comprising a groove arranged on an inner surface of an inward projection of said front panel so as to receive a free surface of said shutter therein.

2. A recording device according to claim 1, wherein said groove is provided with end portions to close said groove in a longitudinal direction of said shutter.

3. A reproducing device including:

a front panel having an insertion slot for receiving a recording medium therethrough; and a shutter pivotally connected to one of a chassis, a shield cover and said front panel so as to open and close said insertion slot of said front panel, said device comprising a groove arranged on an inner surface of an inward projection of said front panel so as to receive a free surface of said shutter therein.

4. A reproducing device according to claim 3, wherein said groove is provided with end portions to close said groove in a longitudinal direction of said shutter.

5. A recording and reproducing device including:

a front panel having an insertion slot for receiving a recording medium therethrough; and a shutter pivotally connected to one of a chassis, a shield cover and said front panel so as to open and close said insertion slot of said front panel, said device comprising a groove arranged on an inner surface of an inward projection of said front panel so as to receive a free surface of said shutter therein.

6. A recording and reproducing device according to claim 5, wherein said groove is provided with end portions to close said groove in a longitudinal direction of said shutter.

* * * * *